US008831574B2

(12) United States Patent  (10) Patent No.: US 8,831,574 B2
Corbett et al.  (45) Date of Patent: Sep. 9, 2014

(54) METHOD AND SYSTEM FOR PERSONALIZING UNAVAILABILITY MESSAGES

(75) Inventors: Giles Corbett, Londres (GB); Paul Beardow, Easton (GB); Romain Pabot, Paris (FR); Remy Bourganel, Paris (FR); Paula des Cognets, Ville d'Avray (FR); Ghislain Ulrich, Paris (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 13/514,551

(22) PCT Filed: Dec. 7, 2010

(86) PCT No.: PCT/FR2010/000815
§ 371 (c)(1),
(2), (4) Date: Aug. 20, 2012

(87) PCT Pub. No.: WO2011/070247
PCT Pub. Date: Jun. 16, 2011

(65) Prior Publication Data
US 2012/0309361 A1    Dec. 6, 2012

(30) Foreign Application Priority Data

Dec. 7, 2009  (FR) ...................................... 0958722

(51) Int. Cl.
*H04M 11/10* (2006.01)
*H04M 3/42* (2006.01)
(52) U.S. Cl.
USPC .......................................... 455/413; 455/417
(58) Field of Classification Search
CPC .................................. H04W 4/12; H04W 4/16
USPC ............... 455/413, 412.1, 412.2, 567, 414.1, 455/456.1, 456.2, 456.3, 456.5, 456.6, 466, 455/417
See application file for complete search history.

(56) References Cited

U.S. PATENT DOCUMENTS 8,077,833 B2 * 12/2011 Ray ................................ 379/87
2002/0137503 A1 * 9/2002 Roderique .................... 455/420
(Continued)

FOREIGN PATENT DOCUMENTS

EP    1672896 A1    6/2006

OTHER PUBLICATIONS

International Search Report dated Mar. 28, 2011 for corresponding International Application No. PCT/FR2010/000815, filed Dec. 7, 2010.

(Continued)

*Primary Examiner* — Christopher M Brandt
(74) *Attorney, Agent, or Firm* — David D. Brush; Westman, Champlin & Koehler, P.A.

(57) ABSTRACT

The present invention relates in a general manner to the generation of unavailability messages (MESS.TXT, MESS.VOC) upon a failure to establish a communication. Thus, in a method of communication comprising, on the sending of a call from a calling user (B) to a called user (A), there are provided the following steps: determining (E406), in an address book (100) of the called user, a group of contacts (110) comprising a contact corresponding to the calling user; determining the availability of the called user for the calling user as a function of an availability cue (142) associated, in the address book, with said determined group; in the event of determined unavailability of the called user, generating (E410, E320), for the attention of the calling user, a personalized unavailability message (MESS.TXT, MESS.VOC) on the basis of at least one information cue supplied (130, 142, 144, 146), in the address book, at the level of the group determined.

12 Claims, 4 Drawing Sheets

(56) References Cited

U.S. PATENT DOCUMENTS

| | | |
|---|---|---|
| 2003/0134626 A1* | 7/2003 | Himmel et al. ............... 455/419 |
| 2004/0052356 A1 | 3/2004 | McKinzie et al. |
| 2008/0084974 A1 | 4/2008 | Dhanakshirur |
| 2008/0146200 A1* | 6/2008 | Martin et al. ................. 455/413 |
| 2008/0159489 A1 | 7/2008 | Xu et al. |
| 2009/0154669 A1* | 6/2009 | Wood et al. ................ 379/88.23 |
| 2009/0323911 A1* | 12/2009 | Dury .......................... 379/88.22 |
| 2009/0325613 A1* | 12/2009 | Kuulusa et al. ............... 455/466 |
| 2010/0022224 A1* | 1/2010 | Li .............................. 455/414.1 |
| 2010/0029251 A1* | 2/2010 | McConnell et al. .......... 455/413 |

OTHER PUBLICATIONS

Jonathan Eyal Gardi, "Busy or Unreachable Mobile Phone Availability via SMS". IP.com Journal, IP.com Inc. West Henrietta, NY, USA, Jul. 23, 2003 (Jul. 23, 2003), XP013011612.

French Search Report dated Sep. 2, 2010 for corresponding French Application No. FR 0958722, filed Dec. 7, 2009.

International Preliminary Report on Patentability and English translation of the Written Opinion dated Jul. 4, 2012 for corresponding International Application No. PCT?FR2010/000815, filed Dec. 7, 2010.

* cited by examiner

METHOD AND SYSTEM FOR PERSONALIZING UNAVAILABILITY MESSAGES

CROSS-REFERENCE TO RELATED APPLICATION

This Application is a Section 371 National Stage Application of International Application No. PCT/FR2010/000815, filed Dec. 7, 2010, which is incorporated by reference in its entirety and published as WO 2011/070247 A1 on Jun. 16, 2011, not in English.

The present invention relates to the generation of unavailability, or even absence, messages, and in particular a method and a system for personalizing such messages.

Absence messages are widespread in communication networks to inform a calling party of the unavailability of the recipient of a call aiming to establish a communication.

These absence messages are found in telephone networks, in particular mobile telephone networks, through voice messages. An unavailability message is delivered to a calling interlocutor from the moment that his call to a recipient interlocutor cannot get through due to unavailability of the recipient.

The absence of success of such a call generally occurs when the recipient of the call does not answer it within a given time or simply when his mobile telephone is switched off or outside of the coverage area. In this case, a voice messaging server sends a pre-established absence message to the calling subscriber of the call, message also named equally well "unavailability message" within the scope of the invention, giving the opportunity to the caller to leave, in turn, a message.

These unavailability messages are also found in other communication networks. For example, an electronic messaging box, also named "email box", can be configured with an absence message when the holder of this email account declares himself unavailable. Thus, when an email from a sender cannot be received by its recipient due to his unavailability, the email server that receives this email automatically sends back an absence message supplied during the configuration of the unavailability.

Unavailability messages in instantaneous messaging services may also be cited.

Thus, in a general manner, when a called user is unavailable for a calling user, the latter finds himself sent an unavailability absence message pre-recorded by the called user.

In the remainder of the description, a focus will be made on voicemail messages of a mobile telephone network, sending welcome messages. Nevertheless, as has been shown above, the unavailability messages, and the present invention, apply to numerous communication networks.

The welcome messages of voice messages are generally recorded beforehand by the subscriber concerned, using his own telephone and by contacting the voice messaging server of his operator.

At a given instant, a single welcome message is available in such a way that all of the calling subscribers that are automatically switched to the voice messaging hear the same message. To satisfy any type of caller, the called subscriber must thus have provided a simple, neutral and general voice message, for example a short text indicating that the subscriber is not available and inviting the caller to leave a message.

However, communications, from the moment that they are established, are very personalized between the caller and the called. In order to make this caller/called relation continue even in the case of unavailability of the called subscriber, there exists a need to personalize the welcome messages, or more generally the unavailability messages, to adapt them to the caller to which they are more specifically intended.

Furthermore, the reasons for the unavailability of a subscriber can vary over time: meetings, holidays, business trips, hospitalisation, etc. Traditionally, it is necessary that the subscriber re-records a new welcome message for each new reason of unavailability, for example at the start and then at the end of holidays. This procedure of changing welcome message is somewhat off-putting, time consuming and likely to be forgotten whereas the subscriber can find himself unable to access his voice messaging to configure it (holidays abroad for example). In addition, the delivery of a new message may turn out to be perfectly unsuited to certain categories of callers.

There thus also exists a need to simplify the management of unavailability messages for subscribers.

Solutions have however been able to be proposed. In this respect, certain solutions of the prior art propose to user subscribers to record a plurality of voice messages with their voice messaging account. But although the subscriber no longer has to record a message at each new reason of unavailability, these messages remain simple, neutral and general because dedicated to all calls.

Also known, from the publication EP 1 672 896, is a system for personalizing messages when a called user is not available. A priority assigned to the calling user by the called user makes it possible to use more or less information cues supplied at the level of a presence server for the message that will be produced.

Nevertheless, this management is not optimal. Firstly, the implementation of priorities is an extra cost for the called user who has to define them beforehand and maintain them up to date as a function of his desires. Secondly, said system does not enable the called user to provide a discriminating strategy of unavailability as a function of the calling users. Such a strategy in fact increases the freedom of the called user.

The present invention aims to improve the known solutions for managing absence messages in communication networks by proposing a personalization of the unavailability messages of a called user intended to be delivered to calling interlocutors when the communication with the called interlocutor cannot get through.

With this purpose, the invention in particular relates to a method for personalizing an unavailability message of a called user intended to be delivered to a calling user in a communication network, said called user having at least one address book organised according to at least one group of contacts grouping together personal contacts, characterised in that the method comprises the steps consisting in:
  determining at least one group of contacts of said called user comprising a contact corresponding to said calling user;
  determining the availability of the called user by means of an information of availability of said called user associated with at least one determined group of contacts; and
  in the event of determination of an unavailability of said called user:
    generating an unavailability message on the basis of at least one first information cue associated, in the address book, with said at least one determined group of contacts; and
    making said generated message available to said calling user.

The invention may also be seen as a method of communication comprising, on the sending of a call by a calling user to a called user, the following steps:

- determining, in an address book of the called user, a group of contacts comprising a contact corresponding to the calling user;
- determining the availability of the called user for the calling user as a function of an availability information associated, in the address book, with said determined group;
- in the event of determined unavailability of the called user, generating, for the attention of the calling user, a personalized unavailability message on the basis of at least one information cue supplied, in the address book, at the level of the group determined.

It will be understood from the preceding that the unavailability of a called user results from a configuration indicated in a profile/group of contacts of the user.

According to the invention, an unavailability status that is supplied at the level of the group of contacts to which the caller belongs is taken into account, in order to determine the availability of the called user. This enables the latter to adjust, in a discriminate manner as a function of his contacts, his own availability.

Moreover, the use of the address book to implement this strategy ensures a simple management, because very readable for the user.

Furthermore, according to the invention, the unavailability message proposed to the calling user is personalized by at least one information cue supplied in the address book, as a function of his belonging to at least one group of contacts to which the called user will have associated him.

By doing so, the unavailability message is personalized as a function of the relation existing between the two users, said relation resulting in particular from the organisation of the address book of the called user into different groups of contacts that he will have defined beforehand.

The invention thus enables a user to propose, at the same time, different and personalized unavailability messages, specific to each of his groups of contacts.

Moreover, thanks to these personalized messages, the caller can obtain more significant information cues on the unavailability of the user (for example the reasons for this unavailability or the moment to again try to reach him), contrary to conventional techniques where a simple, neutral and general method is available at a given instant for all of the callers.

Furthermore, the use of information cues associated with each group of contacts makes it possible to reduce the intervention of the user in the generation of numerous absence messages, as is illustrated hereafter.

In an embodiment of the invention, said generated message is a voice message and the step of generation comprises a step of creating a text message on the basis of said at least one first information and a step of voice synthesis of said text message into a voice message. The invention thus makes it possible to generate a large number of personalized voice absence messages without requiring the user to make as many recordings. One thus has a voice messaging that can dynamically follow the evolution of the availability of the user indicated at the level of the availability information and which is more personalized as a function of the calling subscribers.

As will be seen hereafter, the only intervention of the user then comes down to supplying as often as possible availability information cues or others on his groups of personal contacts. Such an action of supplying information is rapid and normal for a good number of users, in particular social networks or instantaneous messaging services.

It should be noted that this configuration corresponds to the case where the making available comprises the access, by said calling user, to a voice messaging of the user in a telephone network, the voice messaging reading said voice message.

It should also be noted that the invention is not limited to voice messages, as illustrated previously with electronic messages (email) or instantaneous messaging messages. In a variant or as a complement (written confirmation for example), it is also possible to provide that the absence message generated is a text message of the SMS or instantaneous messaging type, transmitted to the calling user.

According to a particular characteristic relative to the voice synthesis, the method comprises a step of verification of the text message by comparison with a text message created beforehand for said at least one determined group, and said voice synthesis only takes place if the text message has been modified. Obviously, this comparison may be further continued by comparing the text messages for a same group of contacts and a same calling contact, in the case in particular where the name of the calling contact is incorporated in the unavailability message. In a variant, the comparison may be made, no longer on the single text message, but on all of the information cues that are incorporated in the unavailability message: availability information, optionally the name of the calling contact, and other information cues as described hereafter, which optionally makes it possible to block the creation of a new text.

In this configuration, the processing load of the voice synthesis server is reduced, which can prove to be very advantageous in view of the large number of new messages that can be created simultaneously for a plurality of called users. In this way, generating the same voice message twice is avoided.

In an embodiment of the invention, a group of personal contacts is associated with a specific geolocalisation information of said called user, and said unavailability message is generated while taking into account said geolocalisation information. By including this geolocalisation in the unavailability message, one increases the level of information to which the calling user accedes.

In particular, the method comprises a step of determination and automatic updating of the specific geolocalisation information of said called user, for example using conventional geolocalisation techniques for mobile telephones or other equipment (triangulation, GPS). This makes it possible to reduce, in an efficient manner, the intervention of the user to increase the precision of the information cues contained in the unavailability messages.

In particular, it may also be provided that, for a given group of contacts, said first information cue is selected from a restricted set of input data, said input data being a function of said geolocalisation information determined for said group of contacts. Also, said first information cue takes account of the at least one information cue representative of an availability status of said called user, said status being automatically updated as a function of said determined geolocalisation information. Here the intervention of the user in the updating of his groups of contacts and thus in the generation of new personalized unavailability messages adapted to these evolutions is again reduced.

In an embodiment of the invention, said unavailability message takes account of a specific naming information of the called user, supplied in association with said determined group of personal contacts. Generally, it involves the name of the user under which he wishes to be known by his different contacts of his address book. In a symmetrical manner, said unavailability message takes account of a specific naming information of the calling user, supplied, in the address book of said called user, in association with a contact corresponding to the calling user. Here it is the name by which the called user names the caller in his address book. Thus, the possibility of personalizing messages is even more enhanced.

According to a characteristic of the invention, the method comprises a step of determining a level of availability of the called user as a function of the at least one availability information cue associated with said determined group of contacts. This arrangement enables in particular an automatic determination of the unavailability of the called user, which leads to the production and the automatic access to the absence message by the calling user. Furthermore, it enables the called user to control selectively the refusal of calls for certain groups of contacts, by playing on this information.

According to a characteristic, said calling user being associated with at least two separate groups of contacts in the address book of said called user, said unavailability message takes account of a first information cue associated with the group of contacts, among said at least two groups of contacts, having the highest availability status. This arrangement makes it possible to favour the establishment of a communication with the called user because the most favourable availability status is taken into account. This also results, in the case of unavailability, in an unavailability message that is capable of containing the most favourable information cues to enable a subsequent communication as quickly as possible.

The invention also relates to a system for personalizing an unavailability message of a called user intended to be delivered to a calling user in a communication network, said called user having at least one address book organised according to at least one group of contacts grouping together personal contacts, characterised in that it comprises:

- a means of determining at least one group of contacts of said called user comprising a contact corresponding to said calling user;
- a means of determining the availability of the called user by means of an information of availability of said called user associated with at least one determined group of contacts;
- a means of generating, in the event of unavailability of said called user, an unavailability message on the basis of at least one first information cue associated, in the address book, with said at least one determined group of contacts; and
- a means of making available said generated message to said calling user.

The system for personalizing has characteristics and advantages analogous to the method for personalizing according to the invention.

In an optional manner, the system may comprise characteristics relating to the steps of the method for personalizing set forth previously.

In particular, in one embodiment, the means of generating an unavailability message comprises a means of creating a text message on the basis of the at least one first information cue and server for voice synthesis of said text message into a voice message; and
said means of making available is a voice messaging server of a telephone network.

According to a particular characteristic, the means of generating an unavailability message comprises a means of comparing said text message with a text message created beforehand for said at least one determined group, so as to guide the voice synthesis server uniquely if the text message has been modified.

In one embodiment, the system comprises a data base storing the address books of several users and synchronized with address books held locally by said users. "Locally" is here taken to mean terminals (computers, mobile telephones, etc.) that the users use. These local terminals are the opposite of the data base which, on account of the fact that it memorises the contacts of several users, is centralised, generally on an equipment of the communication network, equipment that is remote from users.

The invention also relates to a means of storing information comprising instructions for a computer programme suited to implementing the method for personalizing absence messages according to the invention when said programme is loaded into and executed by a computer system.

The invention also relates to a computer programme readable by a microprocessor, comprising instructions for the implementation of the method for personalizing absence messages according to the invention, when said programme is loaded into and executed by the microprocessor.

The storage information means and computer programme have characteristics and advantages analogous to the methods that they implement.

Other particularities and advantages of the invention will become clearer from the following description, illustrated by the appended drawings, in which.

Figure 1:
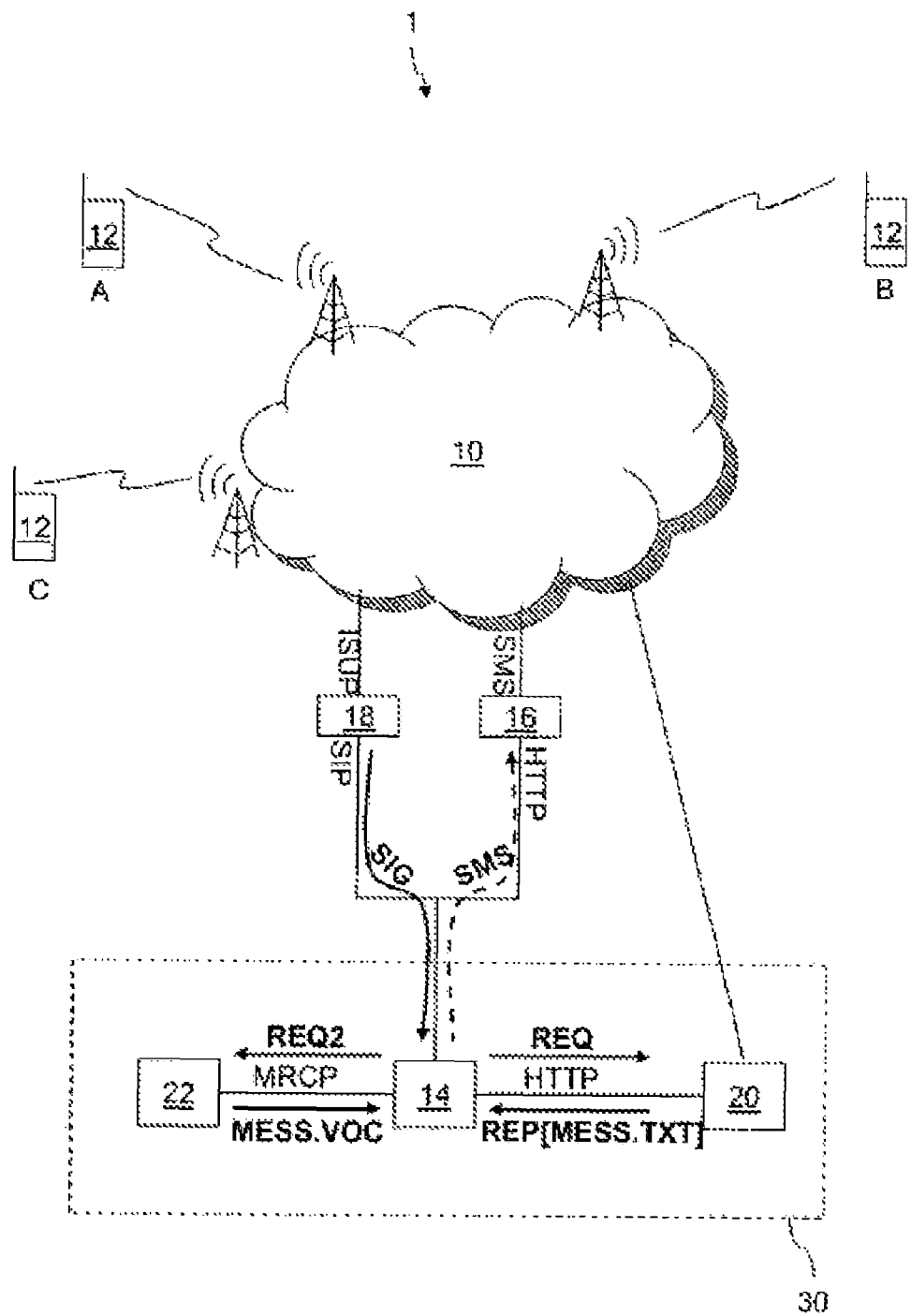
FIG. 1 represents a mobile telephone system for the implementation of the invention.

In FIG. 1 is represented an example of mobile telephone system 1 for an implementation of the invention.

In a manner known in itself, such a mobile telephone system comprises a mobile telecommunication network 10, a plurality of terminals 12 of subscribers A, B, C, a voice messaging server 14, a SMS server 16 and a ISUP/SIP gateway 18 laid out to convert the ISUP signalling messages of the mobile telephone network 10 into SIP signalling messages intended for the voice messaging server 14.

Each subscriber A, B, C has recorded, on the voice messaging server 14, a simple, neutral and general welcome message (hereafter called conventional welcome message) such that in the absence of the present invention, all the other subscribers who do not manage to reach a subscriber automatically switch over to the messaging server (also known as "answering machine"), said server broadcasting to them said welcome message inviting them to leave a message on the voice mailbox of the unavailable subscriber.

Each terminal 12 is provided with a call number, also known by the terminology MSISDN (mobile station ISDN), through which the subscribers can call each other. These mechanisms are widely known to those skilled in the art and are thus not described in further detail.

Each subscriber A, B, C keeps up to date, in his terminal 12, an address book referencing, in the form of contacts, a set of other subscribers. The notion of address book is also widely known to those skilled in the art, for example through the publication EP 1 330 752 showing contacts organised into groups and with each of which is associated an availability status of the contact, for example via a "smiley face" graphic element or a cross or an explicit field.

"Availability status" is a well known element to those skilled in communication systems using contacts. The "availability status" is in particular information characterising the availability of the corresponding subscriber, through a limited number of possible states.

As introduced previously, the notion of availability of a user covers the availability of said user taking account of his professional and/or personal obligations, relational criteria that said user manifests or wishes to establish, at the level of his terminal, vis-à-vis some of his interlocutors, normal or not, brought about to send and/or receive calls or electronic messages to or from remote terminals each provided with an electronic address.

Figure 2:
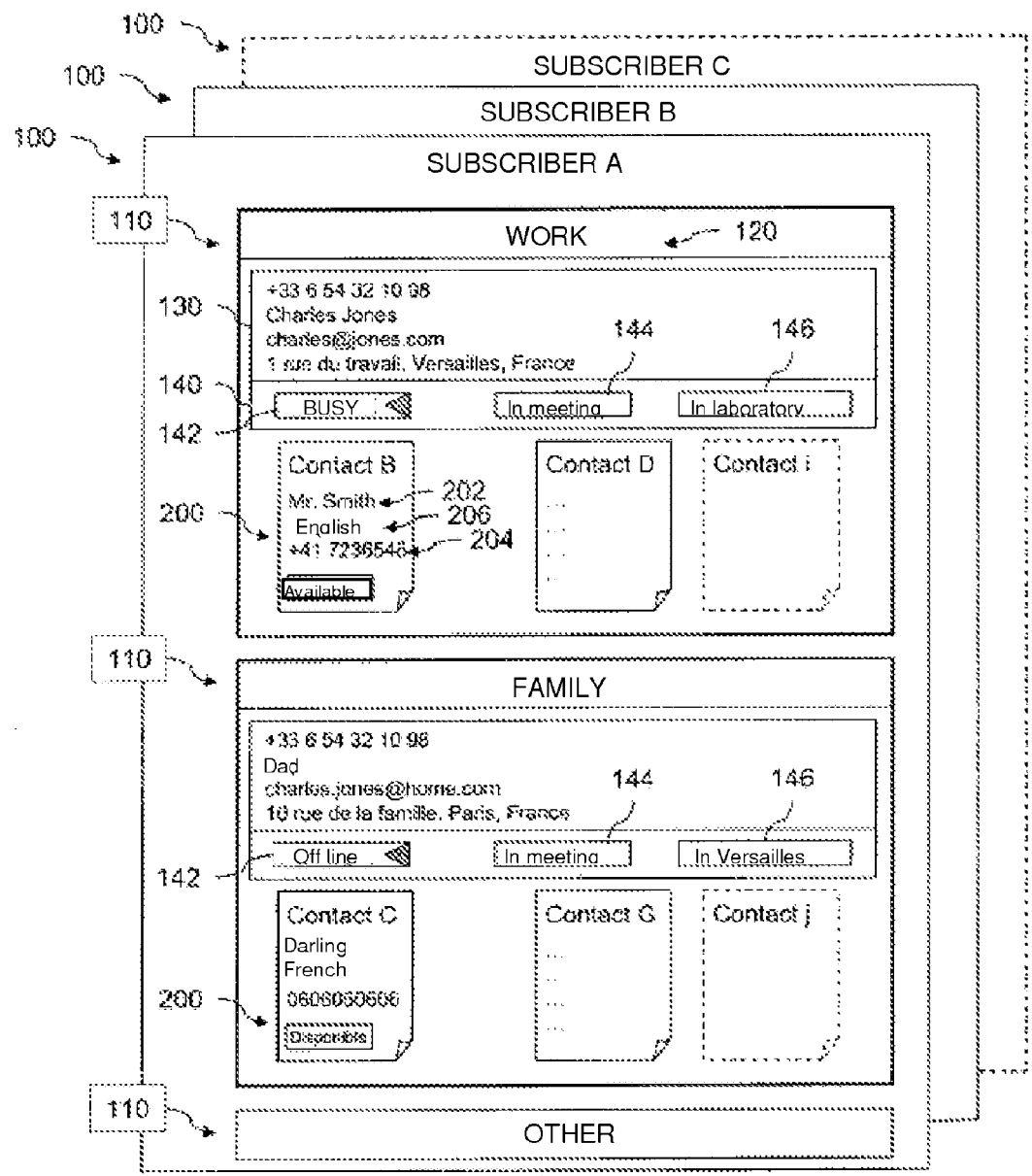
FIG. 2 represents an example of structure of an address book of a subscriber for the implementation of the present invention.

FIG. 2 shows an example of address books 100 for the subscribers A, B and C, all established on the same basis. Thus, the address book of subscriber A comprises several personal profiles or groups 110 each comprising one or more contacts 200 corresponding to other subscribers B, C, D, G, I, J, etc.

These groups 110 of personal contacts are as many different presentations of the same subscriber A which allows said subscriber to specify the relations that he has with the different contacts. Each group 110 of personal contacts is defined by a name 120, static personal information 130 and dynamic information cues 140.

In our example, the name 120 is, according to the group considered, "WORK", "FAMILY" or "OTHERS". The static personal information cues are for example the telephone number MSISDN, a name "PAPA" or "CHARLES JONES" by which the subscriber A wishes to be known by the contacts listed in the group 110, a photograph or image, electronic addresses (MSISDN, email address, etc.), a postal address, etc.

The dynamic information cues comprise availability information cues 142, 144 and a geolocalisation information 146.

The geolocalisation information may be detailed manually by the subscriber A via his terminal 12 or be updated automatically by conventional geolocalisation mechanisms, for example GPS or GSM triangulation. In particular, the geolocalisation information is selected from a predefined set of possibilities for each group 110 of personal contacts, for example "at the American headquarters", "in the laboratory", "in the factory", "in Paris", "abroad" for the "WORK" group and "in Versailles", "at home", "at the country home" for the "FAMILY" group. Thus, when the subscriber returns home, his groups 110 may be updated automatically to indicated "in Paris" for the "WORK" group and "at home" for the "FAMILY" group.

This geolocalisation information can also take the form of a physical localisation information such as a postal address or longitude/latitude coordinates.

The availability information include an availability status 142 that can take four decreasing values of availability: "Available", "Try me", "Busy" and "Off line", and an activity information 144, which may in particular be a free field that the subscriber A completes or a multiple choice menu (optionally as a function of the status 142) reflecting what the subscriber is doing at the time of the call, for example.

In one embodiment of the invention, the availability status 142 may be dynamically updated as a function of the geolocalisation information: for example, if the subscriber A returns home, his status 142 passes dynamically to "Off line" for the "WORK" group.

In a variant, said availability status 142 may be specified manually by the subscriber concerned to indicated if he wishes to receive the calls (the telephone then ringing) or if he wishes to refuse the calls and send them to the voice messaging. For example, the statuses "Busy" and "Off line" switch the call directly to the voice messaging, whereas the two other statuses leave the telephone ringing (less long for "Try me") before automatically switching to the voice messaging.

As described in the document EP 1 330 752 and known to those skilled in the art, the status information 142 may be communicated generally via a central server of address books 20 (FIG. 1), to the other subscribers who have recorded the subscriber A as contact in their own address book.

In our example, the subscriber A can thus see that the subscriber B is "available".

Apart from this information, each contact 200 also comprises the information cues that the subscriber A has been able to supply, for example a name 202, his telephone number MSISDN 204, the conversation language 206 and any other useful information (email or postal address). Mechanisms known to those skilled in the art also enable the subscriber A to recover, for the contact B, the personal information cues that said latter subscriber (B) has supplied in the group of personal contacts of his address book to which the contact A is attached.

It should be noted that the availability information cues 142, 144 transmitted to the different contacts of the address book are those corresponding uniquely to the group of contacts to which said contact belongs. Thus, subscriber B will see, in his own address book, the contact A as "busy", whereas subscriber C will see him as "off line" on account of his belonging to the "FAMILY" group.

In the case where for example subscriber B appears as a contact in several group of personal contacts 110 of subscriber A, the availability information cues transmitted are those relative to the group of contacts that shows the most available status 142. If two groups of contacts 110 have the same most available status, the first listed is chosen.

Returning to FIG. 1, the server 20 comprises a data base for memorising a copy of each of the address books 100 of the subscribers A, B, C. Furthermore, a mechanism of synchronisation of address books enables the server 20 to continuously recover any modifications made by the subscribers in their address books memorised locally on the terminals 12.

The system 30 represented in dotted lines and grouping together the servers 14, 25 20 and a voice synthesis server 22 constitutes a system for personalizing unavailability messages according to the invention. Although this system 30 is represented here in the form of three separate servers, it may be implemented within a same device, for example the server 14. A voice synthesis server as well as speech synthesis algorithms 30 are well known to those skilled in the art.

Figure 3:
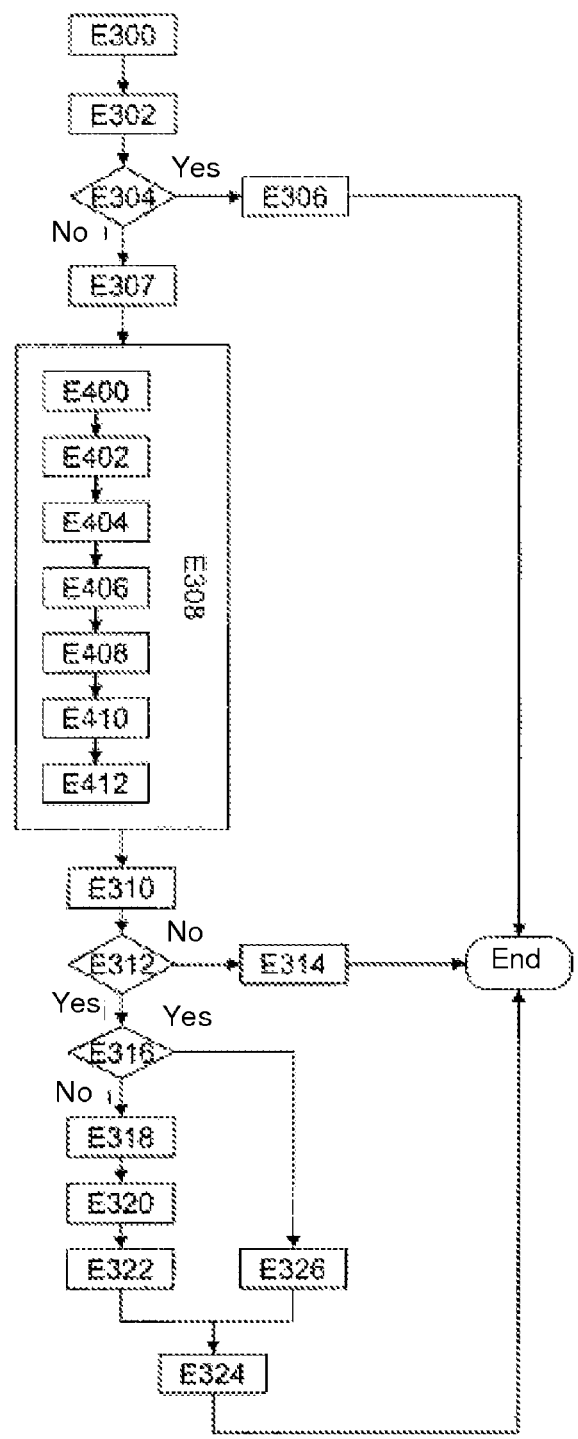
FIG. 3 represents, in the form of flowchart, the steps of generating a personalized welcome message for a voice messaging in the mobile telephone network of FIG. 1.

With reference to FIG. 3, the steps of implementation of the invention will now be described.

At step E300, a subscriber B wishes to call a subscriber A. To do this, the subscriber B composes, on his terminal 12 connected to the network 10, the telephone number MSISDN "+33 654321098" of subscriber A (or any other possible call identifier specific to him) or accesses it through his address book.

At step E302, the establishment of this call is undertaken by ISUP signalling messages (ISDN User Part). It will be recalled that the call cannot get through if the terminal 12 of the subscriber A is switched off or outside of the coverage area or if the subscriber A manually rejects the call.

Furthermore, this signalling brings into play the address book server 20 that determines the availability of the subscriber A for the calling subscriber B.

To do this, the server 20 recovers, in the signalling messages, the MSISDN identifiers of the calling subscriber B, noted MSISDN$_{caller}$, and MSISDN of the subscriber called A, noted MSISDN$_{called}$. It locally recovers the address book of the subscriber A thanks to the number MSISDN$_{called}$. Then, in this address book, it determines the group 110 of personal contacts that contains, as contact, the subscriber B, using the number MSISDN$_{caller}$. In our example, it is the contact B of the group of "WORK" contacts.

Since the availability status 142 of said group of "WORK" contacts is placed on "busy", the call is not established and is automatically redirected to the voice messaging.

At step E304, one determines if the establishment of the communication linked to the call of step E302 has taken place. If this is the case, a conventional communication is established between the two subscribers (step E306).

If this is not the case, the call is routed to the voice messaging at step E307 as in our example between the subscribers A and B. To do this, the ISUP signalling messages are converted into signalisation SIP signalling messages to the server 14 (SIG message in FIG. 1), which thus receives the numbers MSISDN$_{caller}$ and MSISDN$_{called}$.

At step E308, the voice messaging server 14 interrogates the server 20 (request REQ in FIG. 1) through a specific interface to obtain a personalized unavailability text message as a function of information cues relative to the unavailable called subscriber (response REP in FIG. 1 normally including a text message MESS.TXT). The request REQ contains in particular the two MSISDN numbers of the calling subscriber B and the called subscriber A.

Said step E308 comprises the sending (E400) of the request REQ to the server 20. The latter then interrogates the data base to determine if the subscriber A is known by means of the number MSISDN$_{called}$ (E402), in other words if an address book 100 exists which is associated with the subscriber A. If it does not, the response REP indicates, via a field named "isbuddy", that the subscriber A is not known and the conventional welcome message of the subscriber A is sent to the subscriber B via the voice messaging server 14.

If it does, the server 20 determines whether MSISDN$_{caller}$ corresponds to a contact of the address book of the subscriber A (step E404—by using the information 204 of the memorized contacts). If such is the case, the server 20 determines the group 110 of personal contacts that contains the contact B (step E406), here the "WORK" group. Obviously, if several groups of personal contacts contain the contact B, the "most available" according to the criterion of status of availability 142 is chosen.

The server 20 then recovers (step E408), from the group 110 of personal contacts thereby determined, one or more information cues to add to the personalized welcome message.

These information cues may be taken from the personal 130 and dynamic 140 information cues of the subscriber A but also information cues 202, 204, 206 of the contact B present in this determined group 110 of personal contacts.

Then, the server 20 creates a personalized text message MESS.TXT including all or part of said information cues as a function of pre-established syntax rules (step E410). A rule may for example be the following formula: "Sorry, I am <information 144>" where <information 144> is replaced dynamically by the availability information of the determined group of contacts.

In a simple manner, only the activity information 144 is recovered during step E408, such that a simple but personalized message, of type "Sorry, I am in a meeting" is created on the basis of this recovered information. In the absence of such activity information 144 (field empty), the response REP returned indicates, for example in a similar manner to the negative case of step E402, that the conventional welcome message must be used.

In a more complex manner, the activity information 144 as well as the geolocalisation information and the name of the called subscriber A are recovered, so as to create a message having more signification for the calling subscriber B: "Charles Jones is in a laboratory meeting".

In order to yet further personalize this message, the name 202 of the calling contact B can also be recovered so as to create the following message: "Sorry Mr. Smith. Charles Jones is in a laboratory meeting at the moment".

Obviously, different rules of composition of text messages may be provided, taking account of more or less information cues present in the address book of the subscriber A. Said rules may in particular take account of the absence of an information and may be configured by the subscribers via a dedicated remote access (structure of the phrase of the message, information cues taken into account, etc.).

Furthermore, in a multilingual version, the language information 206 of the contact B may be recovered to create a message in said language: "Sorry, I am in a meeting" or "Sorry Mr. Smith. Charles Jones is in a meeting in the laboratory".

It may be seen here that the message is very personalized. For example, for the subscriber C calling the subscriber A, the message created could be: "Sorry darling, Dad is in a meeting in Versailles at the moment", when for example, the subscriber C belongs to the "FAMILY" group of contacts of the address book of the subscriber A. Once the text message has been created, the response REP comprising said message is returned to the voice messaging server 14 at step E412.

Figure 4:
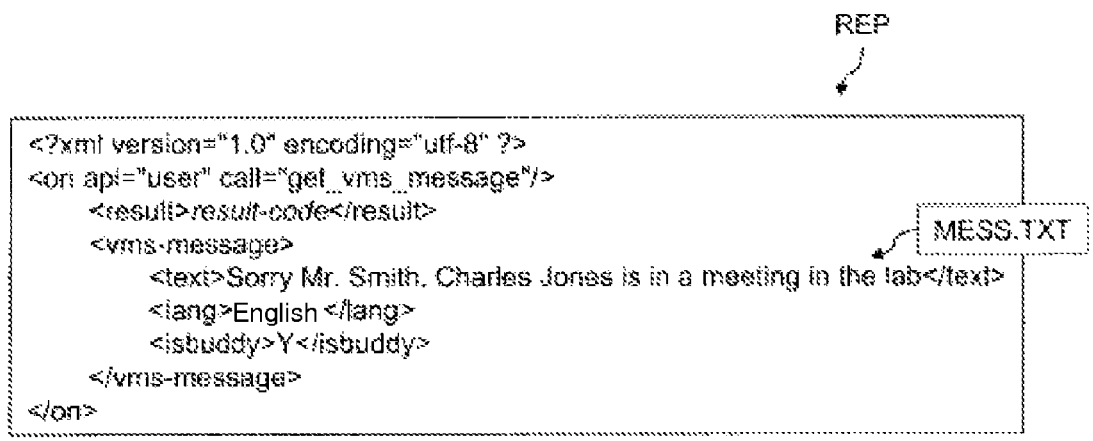
FIG. 4 illustrates an example of message communicated between the central address book server and the voice messaging server of FIG. 1.

This response may for example take the form of an XML file, an example of which is given in FIG. 4. In this example, the function implemented on the server 20 is named "get_vms_message". It returns a first field <text> containing the message MESS.TXT, a second field <lang> containing the language information 206 and a third field <isbuddy> taking the value "Y" to indicate that the subscriber A has been identified and the contact B found.

At step E310, the server 14 receives the response REP and firstly determines whether the field <isbuddy> equals "Y" (step E312). If this is not the case, the voice messaging server 14 reads the conventional welcome message, as implemented in the solutions of the prior art (step E314).

If <isbuddy> equals "Y", then the text message MESS.TXT is compared (step E316) to a text message MESS.TXT.OLD memorised by the server 14 in order to determine whether it has undergone a modification, for example due to an updating of the activity information or the geolocalisation information in the "WORK" group 110 of personal contacts of the subscriber A.

To do this, the voice messaging server 12 memorises, for each pair MSISDN$_{caller}$-MSISDN$_{called}$ the final message MESS.TXT received. Other embodiments may however be envisaged to take into account the level of precision of the information cues introduced into the message. For example, for a simple message, only one message MESS.TXT per group 110 of personal contacts may be memorised, in which case the information of group of personal contacts is also indicated in the response REP (for example via a unique identifier of the group).

If the comparison is negative (text modified or no old text memorised—no outcome of step E316), a request REQ2 containing the text MESS.TXT and the language information is transmitted to the voice synthesis server 22 (step E318). At this occasion, the message MESS.TXT overwrites the old message MESS.TXT.OLD.

At step E320, the voice synthesis server 22 generates a voice message MESS.VOC on the basis of the text message MESS.TXT. To optimise the quality of said voice message, the language information is also taken into account in order to use the intonations of the targeted language. The voice message thereby obtained may be an MP3 type sound file.

The voice message MESS.VOC is then returned to the voice messaging server 12, which stores it in its memory, in particular in a manner associated with the message MESS.TXT.OLD saved at step E318 (step E322).

The voice message MESS.VOC that is personalized (as opposed to the conventional welcome message) is then read and sent to the calling subscriber B, as welcome message of the messaging of the subscriber A (step E324).

If the comparison of step E316 is positive (text message unchanged), the server 14 then recovers the voice message MESS.VOC associated, in the memory, with the text message MESS.TXT.OLD (step E326) then reads it to the subscriber B at step E324.

As is clear from this description, the welcome messages read to the calling subscribers are thus highly personalized as a function of their relation with the called but not reached subscriber. This relation is implemented, in the invention, through groups 110 of personal contacts who make up the address books of contacts.

By playing on the rules for creating text messages, the subscriber A can thus supply more or less information to certain groups of subscribers.

It may also be seen that the simple updating of the information cues 130, 140 associated with his groups of contacts, a subscriber can generate, without much work for him, a large number of different welcome messages. Thus, if the subscriber A changes location or activity for the "WORK" group, when the subscriber B again calls the subscriber A and reaches the voice messaging, he hears a new message based on these updated information cues.

In a variant of the invention, the use of personalized voice messages may be eliminated to the profit of the sending of personalized SMS messages by the server 16. In this case, the server 22 turns out to be pointless and step E316 then consists in transmitting, to the server SMS 16, an instruction for sending an SMS to the subscriber B, said instruction comprising the message MESS.TXT (for the body of the SMS) and the number $MSISDN_{caller}$ to identify the recipient of the SMS message. It follows from this that the SMS is sent to the subscriber B, who thus receives the personalized absence message in text form.

Furthermore, during step E308, the number $MSISDN_{caller}$ may be unknown, either because it is not transmitted in the signalling messages, or because the calling subscriber has masked his telephone number. In this case, the calling subscriber then accesses the conventional welcome message.

Nevertheless, an all the same personalized message may be provided and read to the calling subscriber. To do this, the request REQ only contains the number $MSISDN_{called}$ and the address book of the subscriber A contains a group 110 of personal contacts by default, known as "OTHERS" (or "EVERYONE ELSE"), which has the minimum of personal information cues. Step E308 then consists in recovering information cues of this "OTHERS" group of contacts and creating a personalized text message including in particular an availability information 142, 144 associated with said group of contacts.

Figure 5:
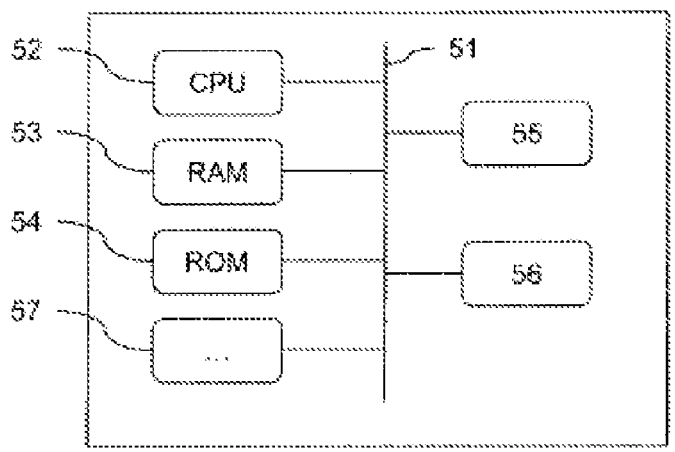
FIG. 5 shows a particular physical configuration of a device suited to an implementation of the method according to the invention.

FIG. 5 shows schematically a device 50 for the implementation of the invention, constituting all or part of the system for personalizing 30.

The device 50 comprises a communication bus 51 to which are connected a central processing unit or "microprocessor" 52, a random access memory 53, a read-only memory 54, a display device 55, a pointing device 56 and optionally other peripheral devices 57 (communication interface, floppy disk or disk reader, etc.).

The read-only memory 54 comprises programmes, the execution of which enables the implementation of the method for personalizing according to the invention, as well as the tables or registers making it possible to save for example the associated MESS.TXT and MESS.VOC messages.

During the execution of programmes, the executable code thereof is loaded into the random access memory 53, type RAM, and executed by the microprocessor 52. This execution enables the sending of requests REQ and REQ2 as well as their processing to generate the MESS.TXT and MESS.VOC messages.

The display 55 and pointing 56 devices enable an administrator to configure the system, in particular the voice synthesis parameters.

The device described herein and, in particular, the central unit 52, are able to implement all or part of the processing steps described with reference to FIGS. 1 to 4, to implement the methods according to the present invention and constitute the systems according to the present invention.

The preceding examples are only embodiments of the invention which is not limited thereto.

Although the invention has been described in relation to a mobile telephone network, the invention also applies to other networks, type fixed telephone network or computer network implementing for example an electronic messaging or instantaneous messaging service. In a manner known in itself, such a service also comprises also a book of contacts that may be used according to the teachings of the invention to produce personalized absence messages.

The invention claimed is:

1. A method for personalizing a message of unavailability of a called user intended to be delivered to a calling user in a communication network, said called user having at least one address book organised according to at least one group of personal contacts grouping together personal contacts, wherein the method comprises:

determining, with a processor, at least one group of personal contacts of said called user comprising a contact corresponding to said calling user;

determining availability of the called user with the processor, using an availability information cue of said called user associated with at least one group of determined personal contacts; and in the event of determination of an unavailability of said called user:

generating an unavailability message as a voice message on the basis of at least one first information cue associated, in the address book, with said at least one determined group of personal contacts, wherein said unavailability message includes specific naming information of the calling user, supplied, in the address book of said called user, in association with the contact corresponding to said calling user, and wherein generating the unavailability message comprises creating a text message from said at least one first information cue, and voice-synthesizing said text message into said voice message; and making said generated message available to said calling user.

2. The method according to claim 1, wherein said at least one group of personal contacts is associated with specific geolocalisation information of said called user, and said unavailability message is generated on the basis of said geolocalisation information.

3. The method according to claim 2, comprising automatically updating said specific geolocalisation information of said called user.

4. The method according to claim 2, in which said first information cue takes into account at least one information cue representative of an availability status of said called user, said status being automatically updated as a function of said determined geolocalisation information.

5. The method according to claim 1, in which said unavailability message takes account of a specific naming information of the called user, supplied in association with said determined group of personal contacts.

6. The method according to claim 1, in which said calling user is associated with at least two separate groups of contacts in the address book of said called user, said unavailability message takes account of a first information cue associated with the group of contacts, among said at least two groups of contacts, having the highest availability status.

7. The method according to claim 1, wherein the geolocalisation information is selected from a predefined set of possibilities for each group of personal contacts.

8. A method of communication comprising, on sending of a call by a calling user to a called user, the following steps:

determining with a processor, from an address book of the called user, a group of personal contacts comprising a contact corresponding to the calling user;

determining availability of the called user for the calling user with the processor as a function of an availability information associated, in the address book, with said determined group;

in the event of determined unavailability of the called user, generating, for the attention of the calling user, a personalized unavailability message as a voice message on the basis of at least one information cue supplied, in the address book, at the level of the determined group of personal contacts, wherein said unavailability message includes specific naming information of the calling user, supplied, in the address book of said called user, in association with the contact corresponding to said calling user, and wherein generating the unavailability message comprises creating a text message from said at least one information cue, and voice-synthesizing said text message into said voice message.

9. A system for personalizing an unavailability message of a called user intended to be delivered to a calling user in a communication network, said called user having at least one address book organised according to at least one group of personal contacts grouping together personal contacts, wherein the system comprises:

means for determining at least one group of personal contacts of said called user comprising a contact corresponding to said calling user;

means for determining availability of the called user by means of an information of availability of said called user associated with at least one determined group of personal contacts;

means for generating, in the event of unavailability of the called user, an unavailability message as a voice message on the basis of at least one first information cue associated, in the address book, with said at least one determined group of personal contacts, wherein said unavailability message includes specific naming information of the calling user, supplied, in the address book of said called user, in association with the contact corresponding to said calling user, and wherein generating the unavailability message comprises creating a text message from said at least one first information cue, and voice-synthesizing said text message into said voice message; and means for making available said generated message to said calling user.

10. The system according to claim 9, in which the means for generating an unavailability message comprises means for creating a text message on the basis of the at least one first information cue and a server for voice synthesis of said text message into a voice message; and said means for making available is a voice messaging server of a telephone network.

11. The system according to claim 9, in which the system comprises a data base storing the address books of several users and synchronized with the address books held locally by said users.

12. A computer-readable memory comprising a computer program product stored thereon, comprising instructions for a method for personalizing a message of unavailability of a called user intended to be delivered to a calling user in a communication network, when said program is executed by said processor, said called user having at least one address book organised according to at least one group of personal contacts grouping together personal contacts, and wherein the instructions comprise:

instructions configured to determine at least one group of personal contacts of said called user comprising a contact corresponding to said calling user;

instructions configured to determine availability of the called user with the processor, using an availability information cue of said called user associated with at least one group of determined personal contacts;

instructions configured to, in the event of determination of an unavailability of said called user:

generate an unavailability message as a voice message on the basis of at least one first information cue associated, in the address book, with said at least one determined group of personal contacts, wherein said unavailability message includes specific naming information of the calling user, supplied, in the address book of said called user, in association with the contact corresponding to said calling user, and wherein generating the unavailability message comprises creating a text message from said at least one first information cue, and voice-synthesizing said text message into said voice message; and make said generated message available to said calling user.

* * * * *